United States Patent [19]

Efros

[11] 4,161,328
[45] Jul. 17, 1979

[54] BICYCLE

[76] Inventor: Boris Efros, 920 N. Stanley Ave., Los Angeles, Calif. 90046

[21] Appl. No.: 774,620

[22] Filed: Mar. 4, 1977

[51] Int. Cl.² .............................................. B62J 1/00
[52] U.S. Cl. .................................. 280/290; 280/221; 280/255; 280/289 E
[58] Field of Search .......................... 280/290, 289 E; 297/384, 385

[56] References Cited

U.S. PATENT DOCUMENTS 2,229,778  1/1941  Taulbec .............................. 280/290

FOREIGN PATENT DOCUMENTS 879302   2/1943  France ...................................... 280/290
23722 of 1895  United Kingdom ...................... 280/290

Primary Examiner—David M. Mitchell
Assistant Examiner—Donn McGiehan

Attorney, Agent, or Firm—Spensley, Horn & Lubitz

[57] ABSTRACT

An oscillating pedal bicycle in which the downward force exerted by a rider is converted from the oscillating-motion of the pedals into a unidirectional rotation of the drive wheel. The oscillating motion of the pedals is transmitted by flexible tension members to a conversion mechanism for converting the linear motion of such tension members into the rotary motion of the drive wheel. Maximum utilization of the motive power of the rider is achieved through the use of a quick-release, variable position body restraint and a variable height seat, both of which are adjustable while the bicycle is in motion, while maximum transfer and conversion of such motive power is achieved by an improved pedal return and tension member rewind mechanism and an improved drive mechanism. Pedal stabilizers, rotatable foot restraints and foot actuated lever control mechanisms are provided to maximize motive power and efficiency.

15 Claims, 31 Drawing Figures

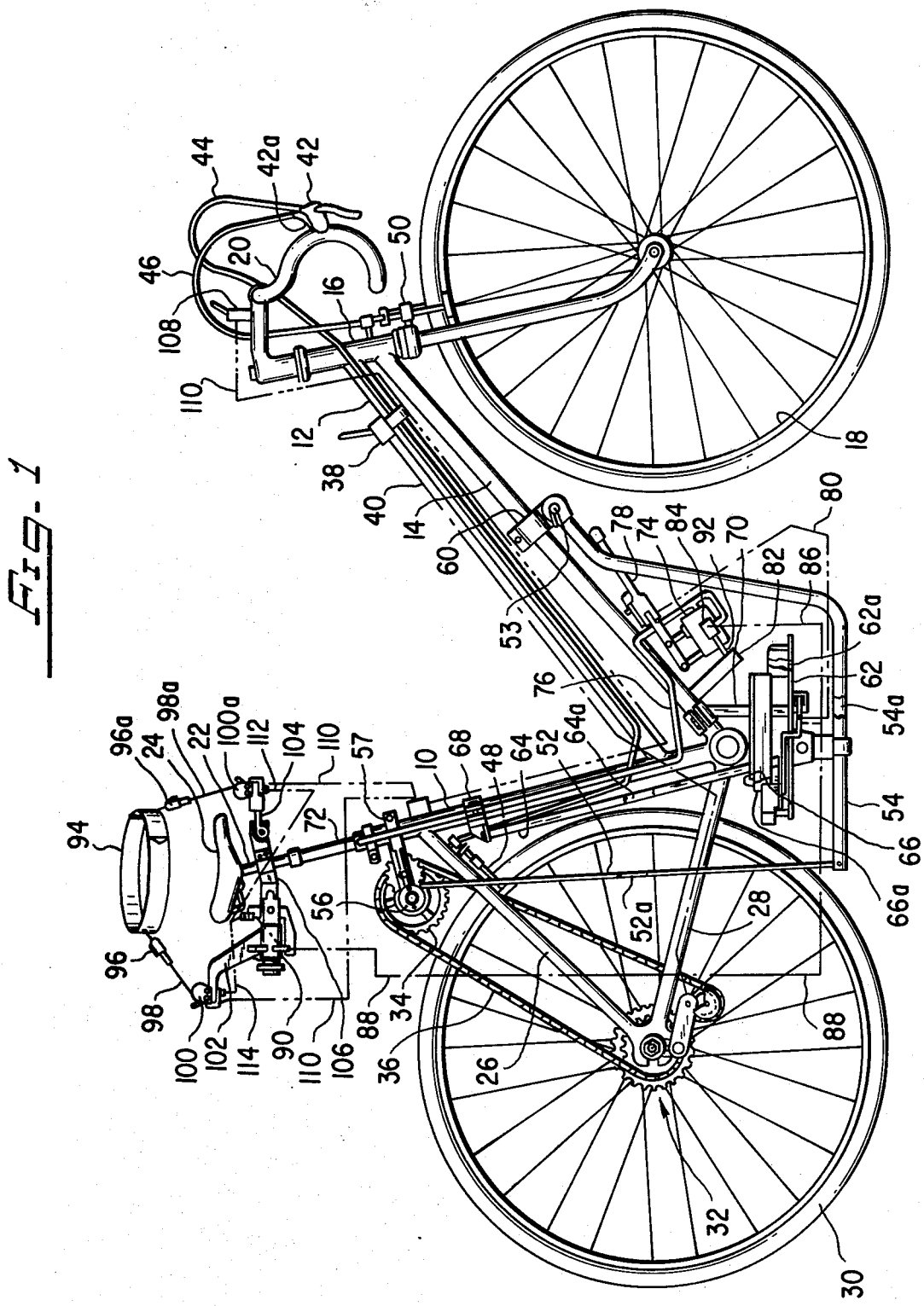

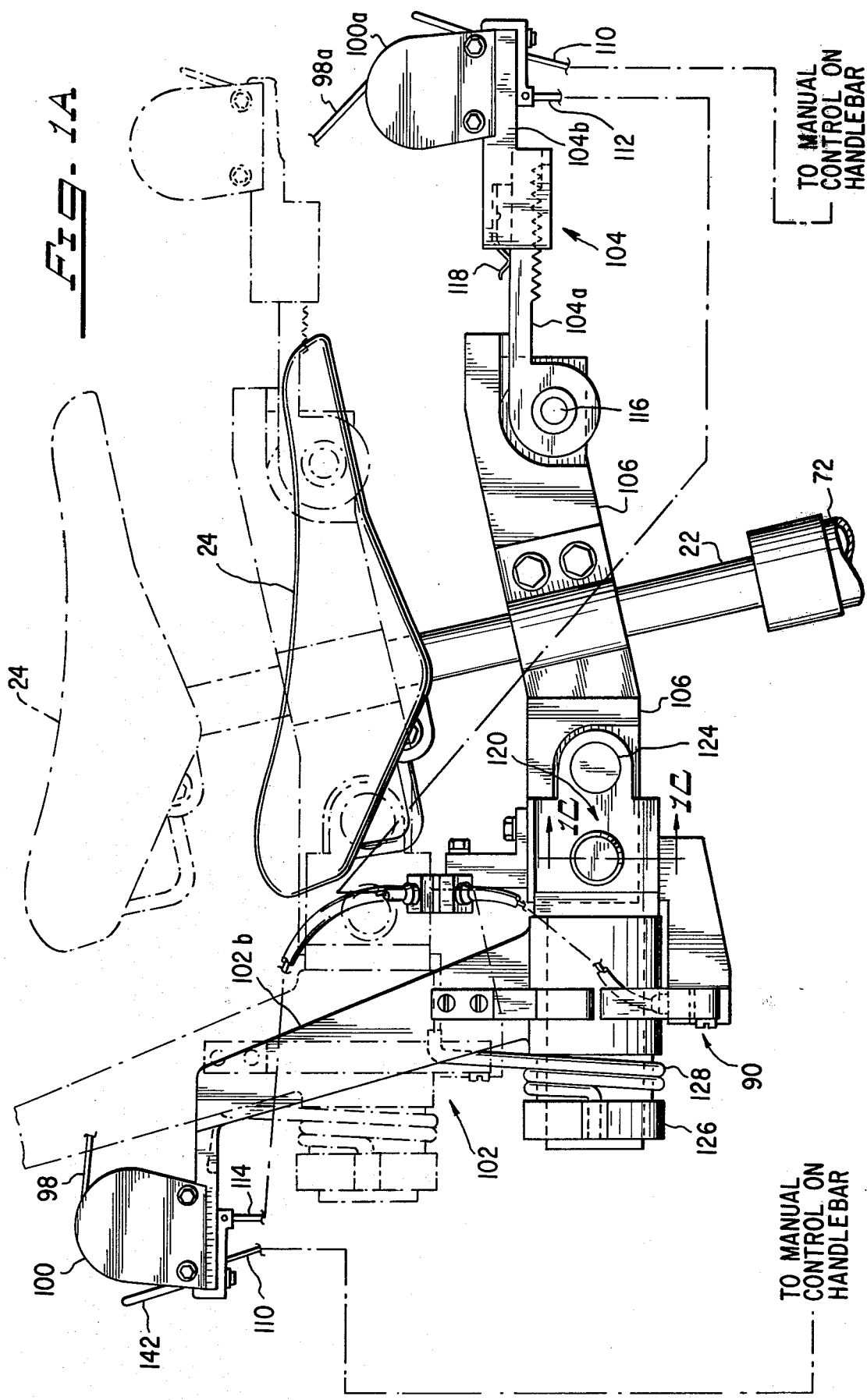

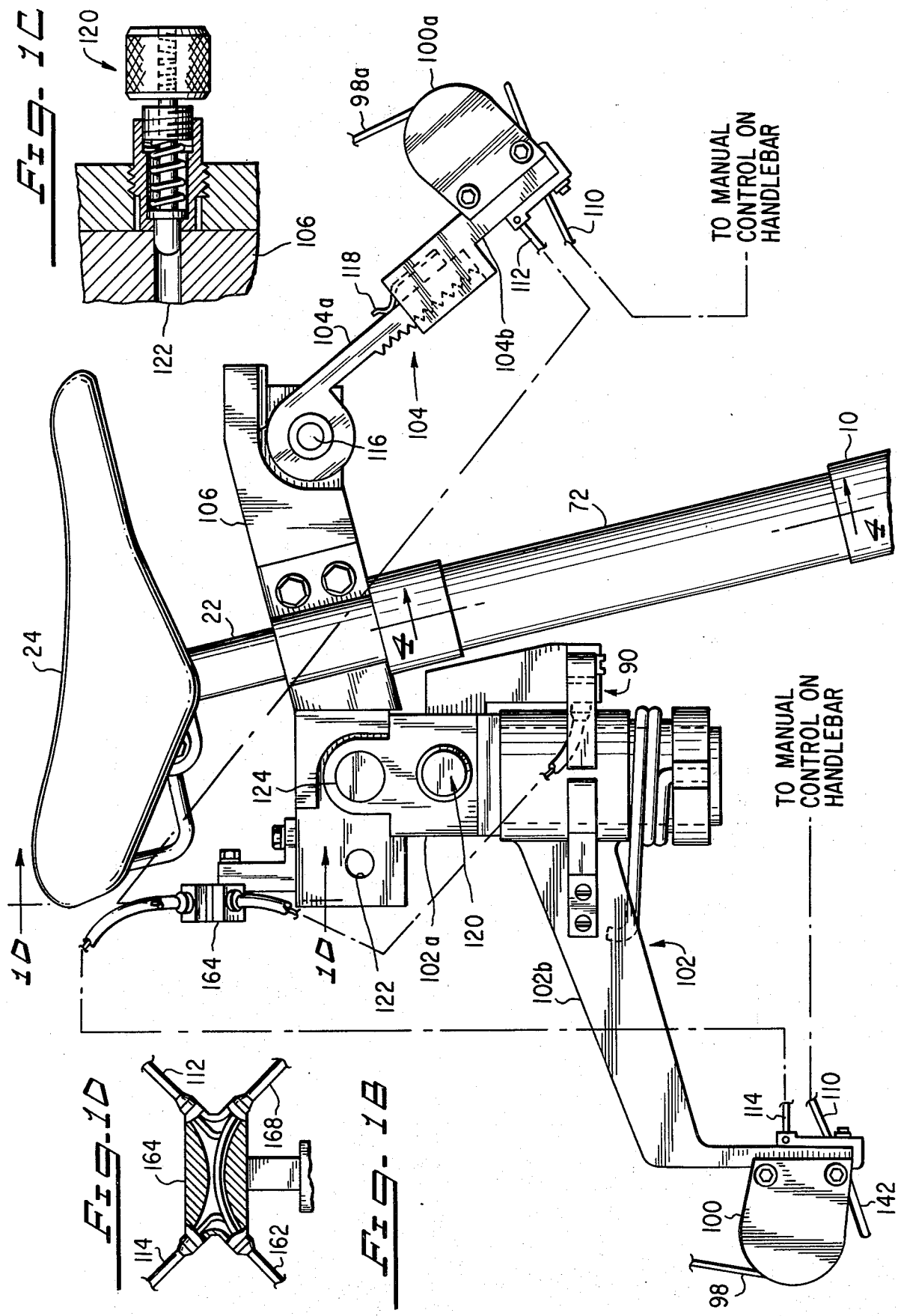

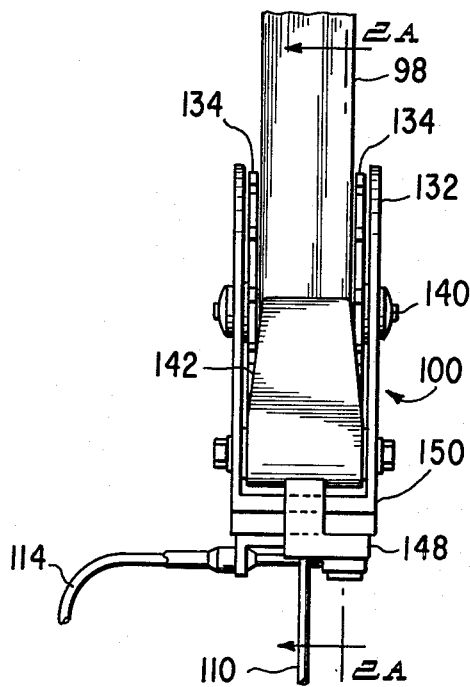
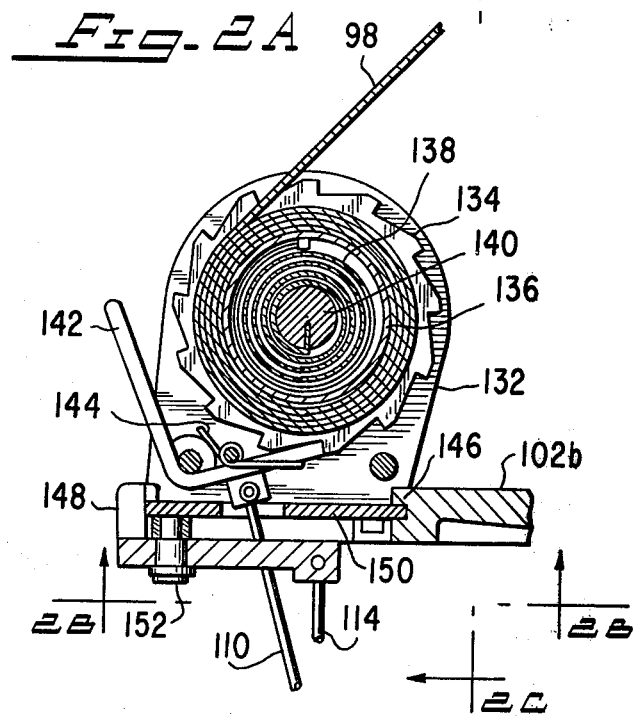
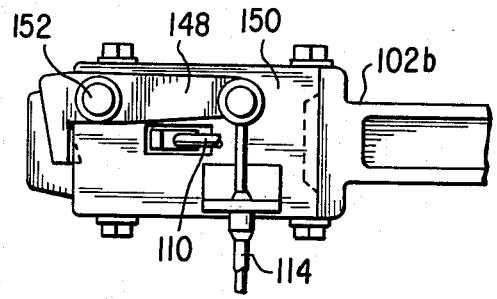
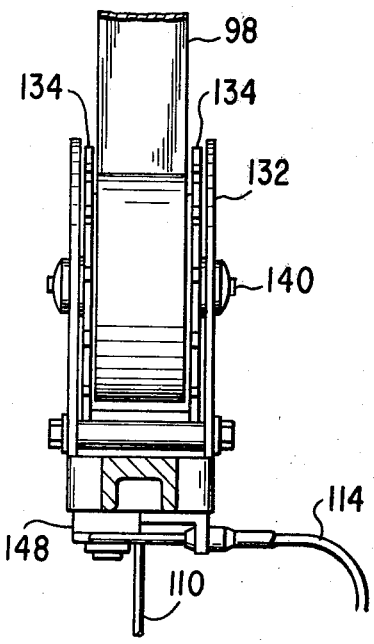
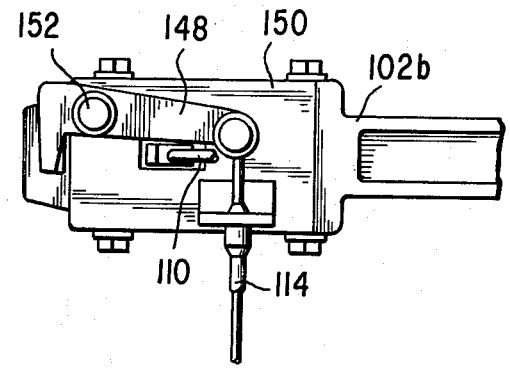

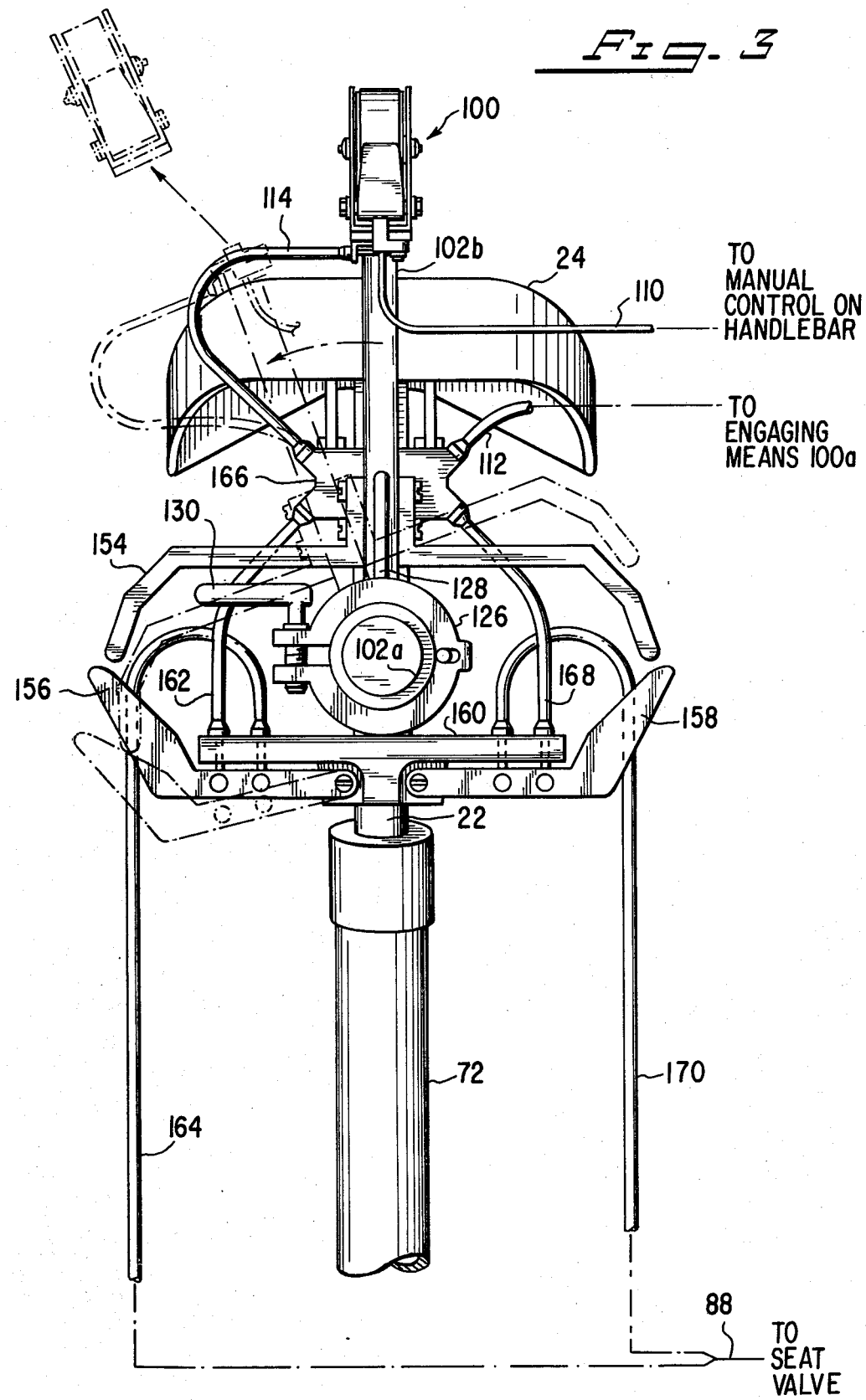

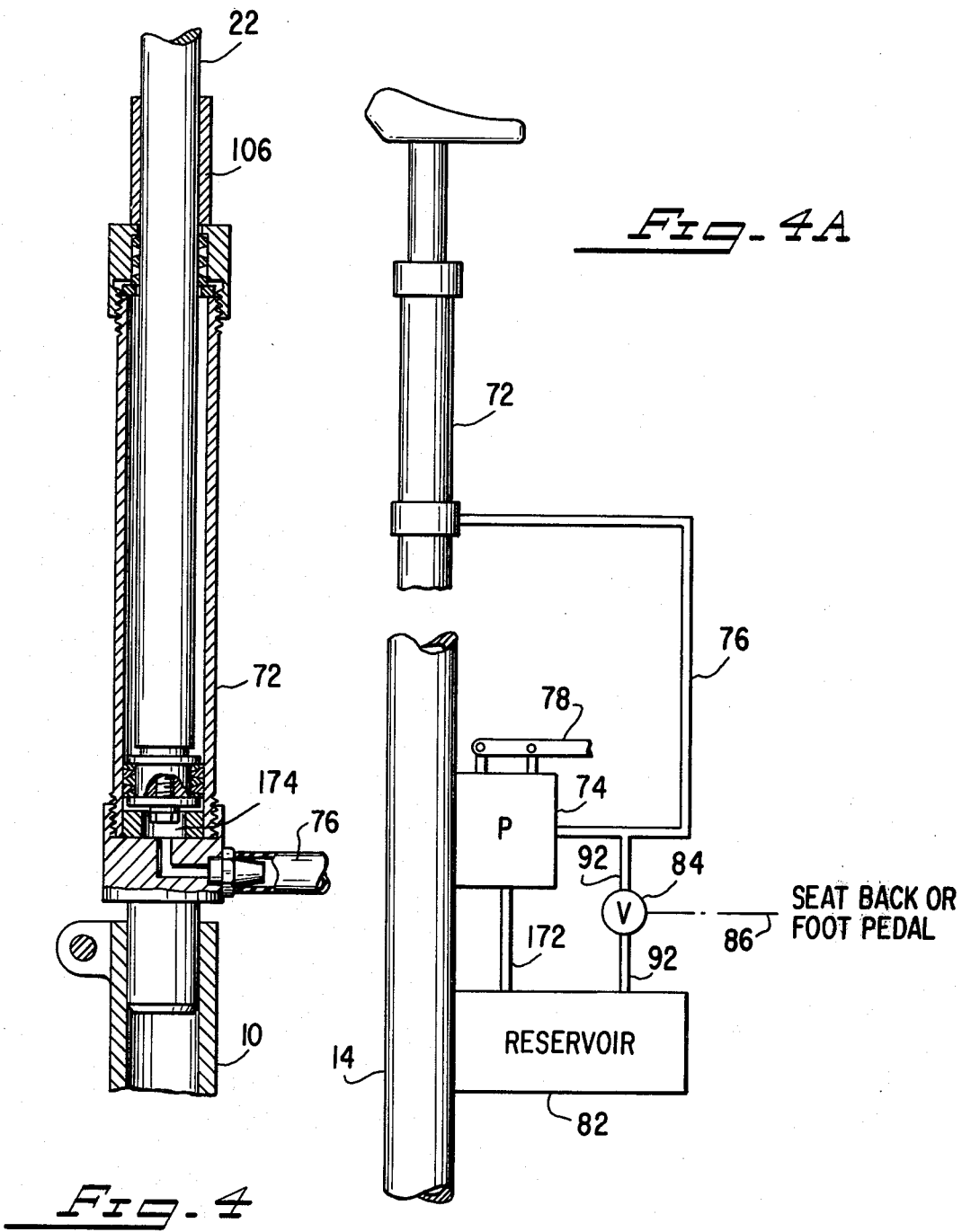

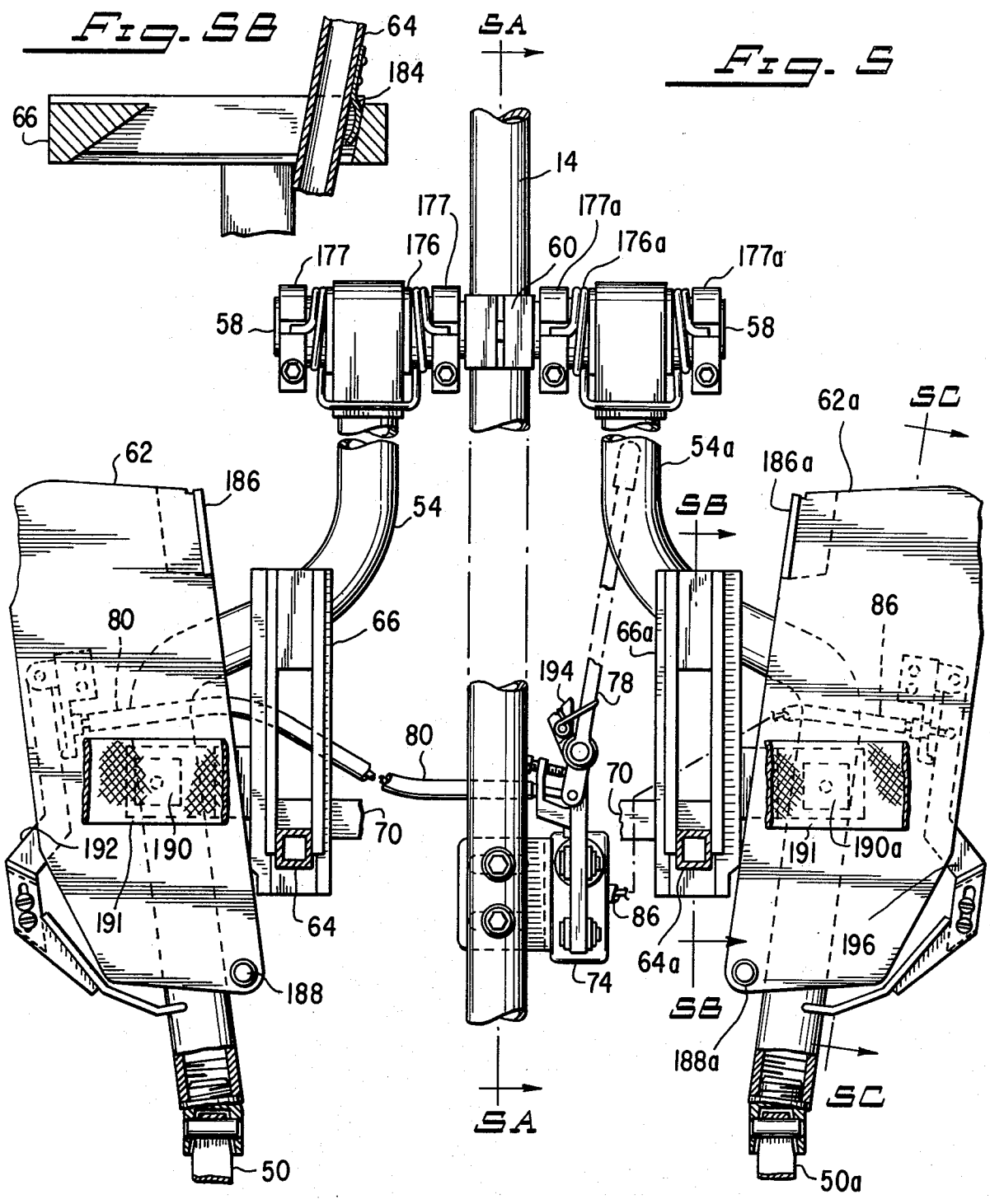

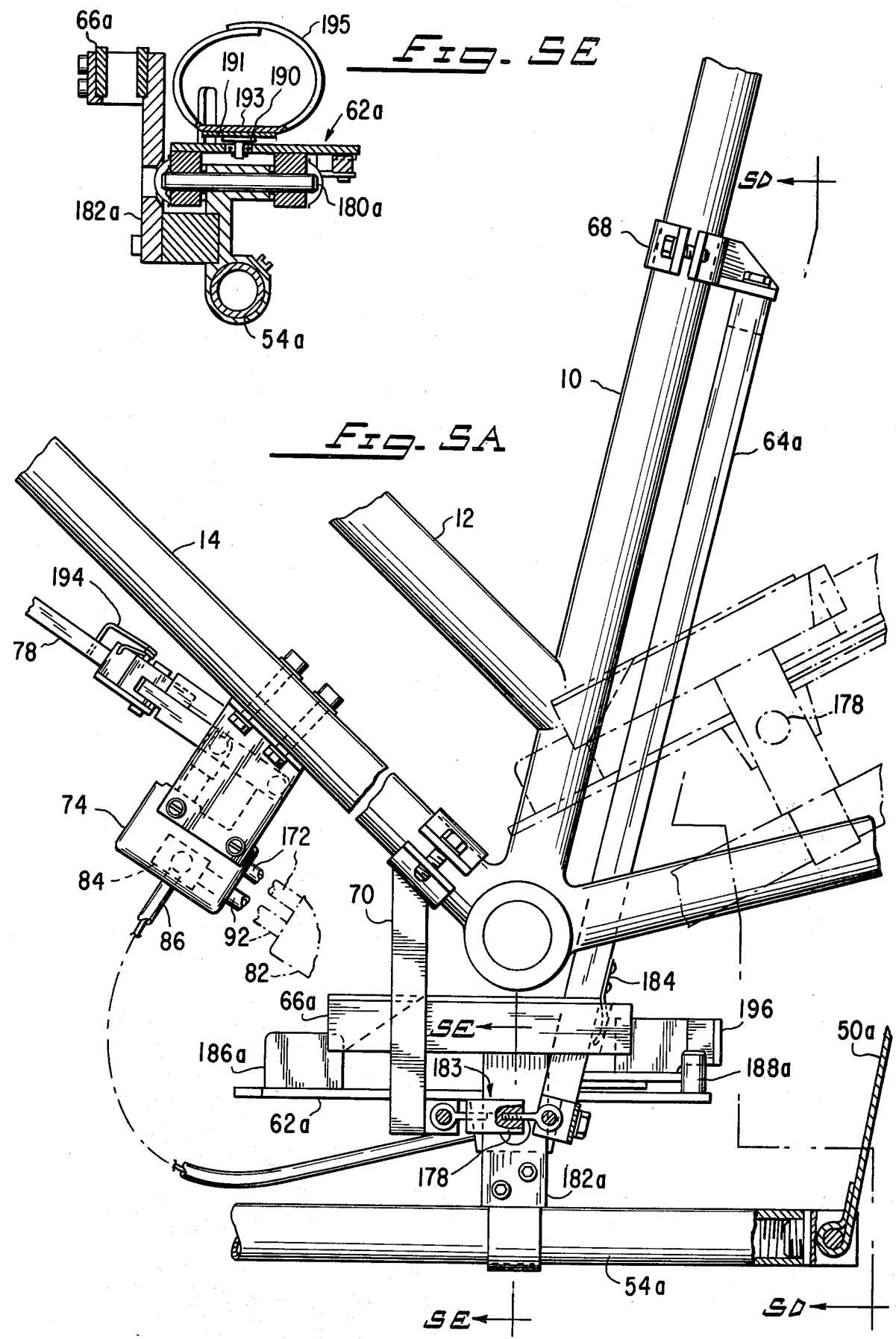

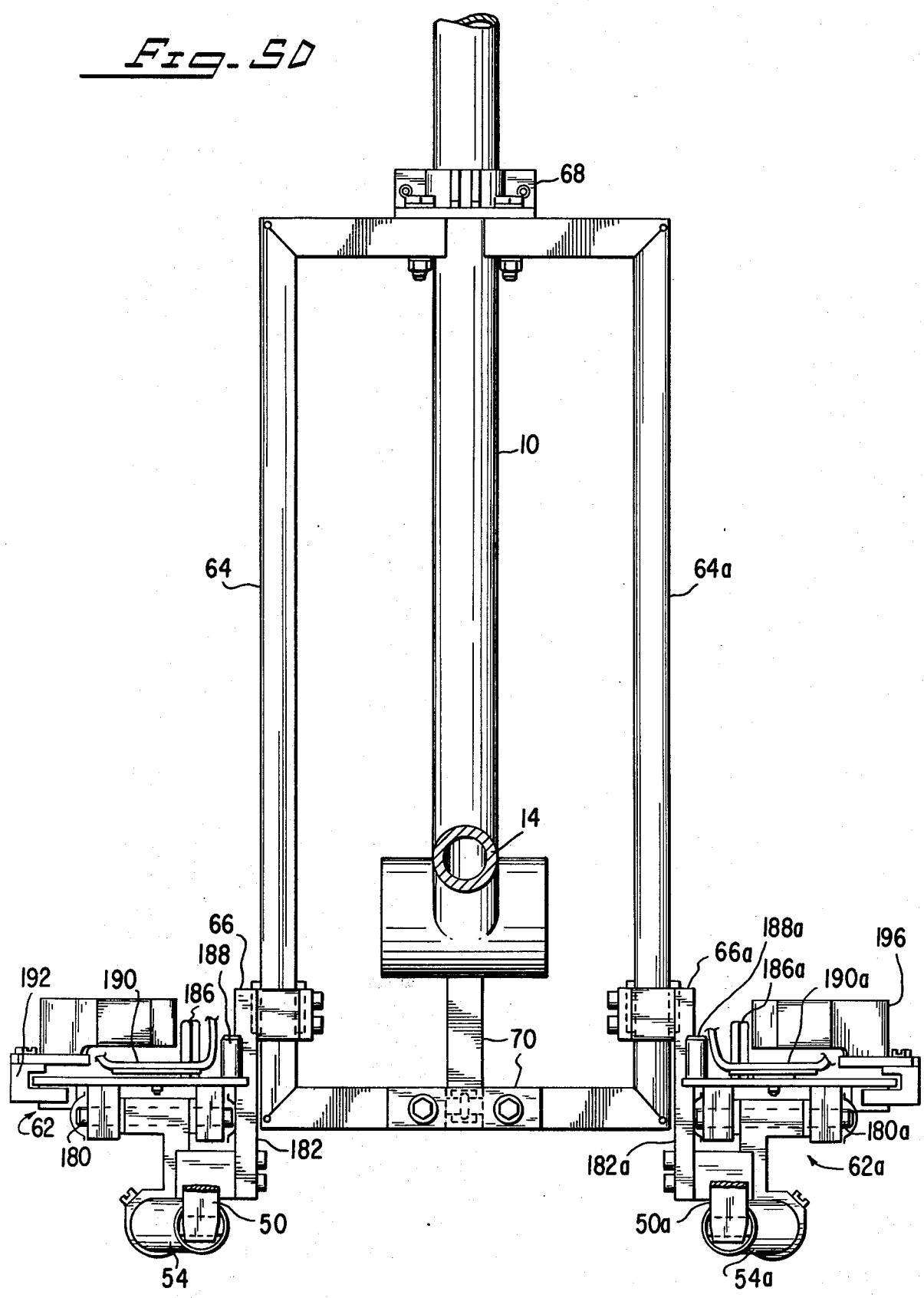

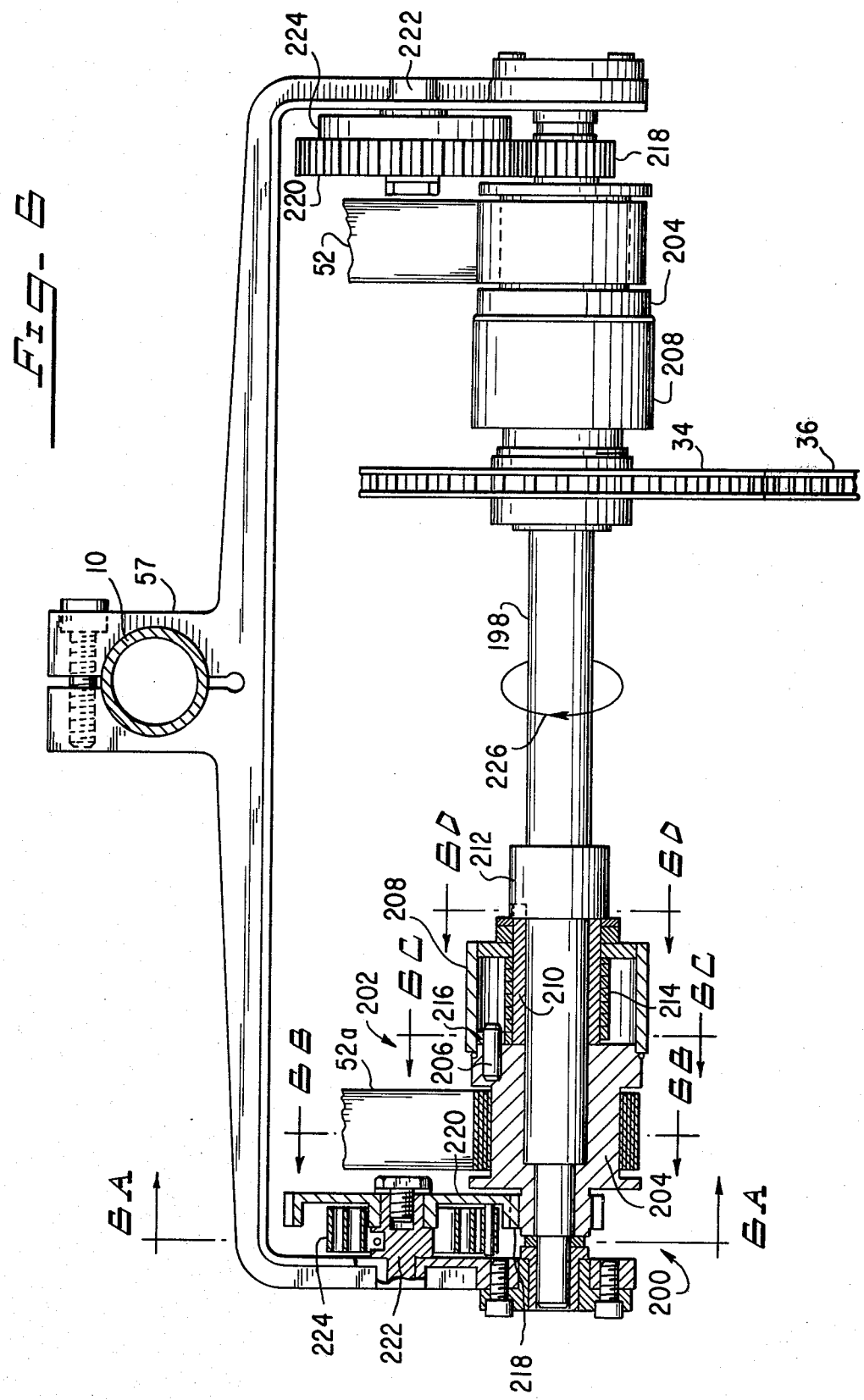

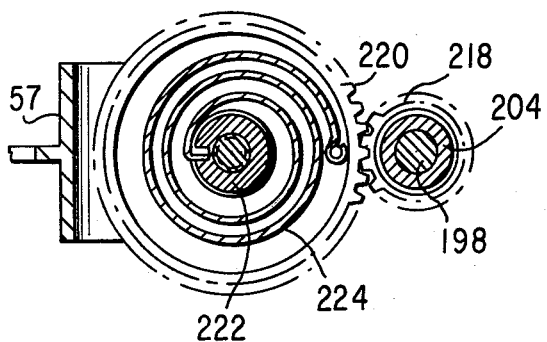
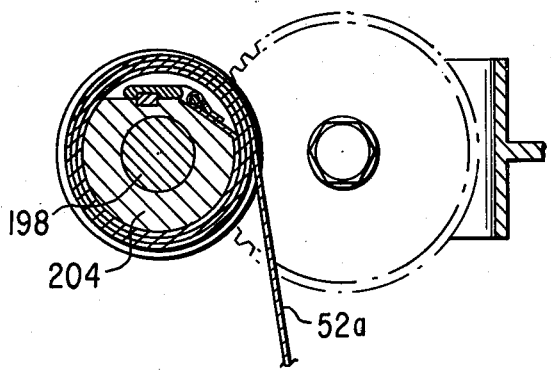
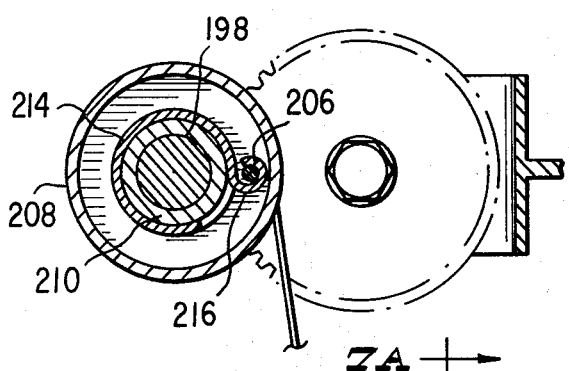
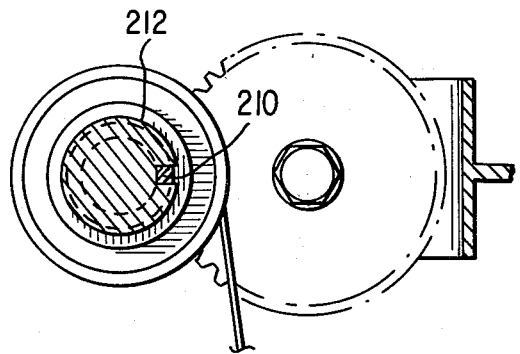
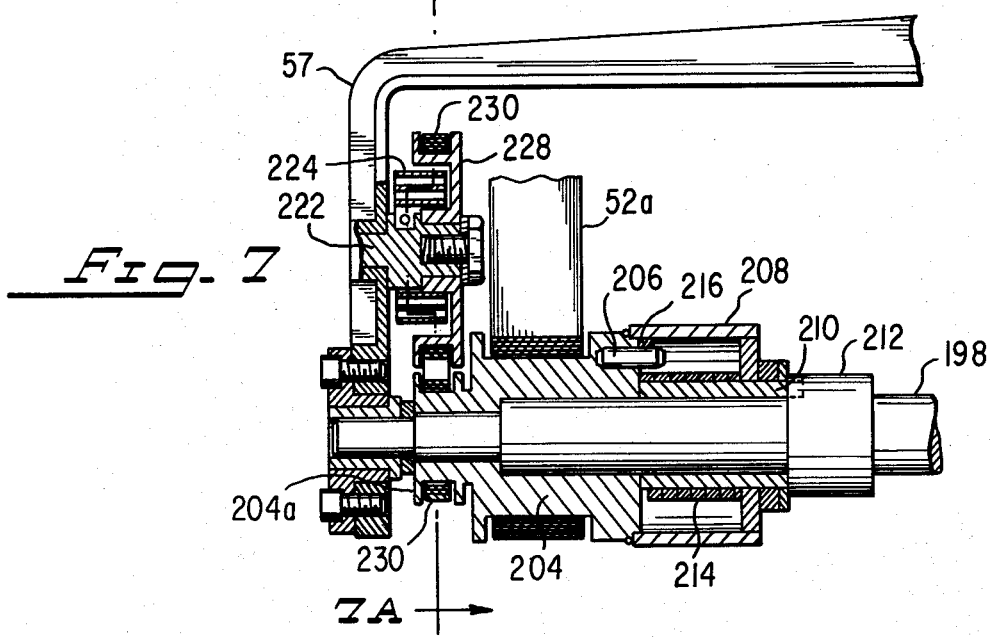

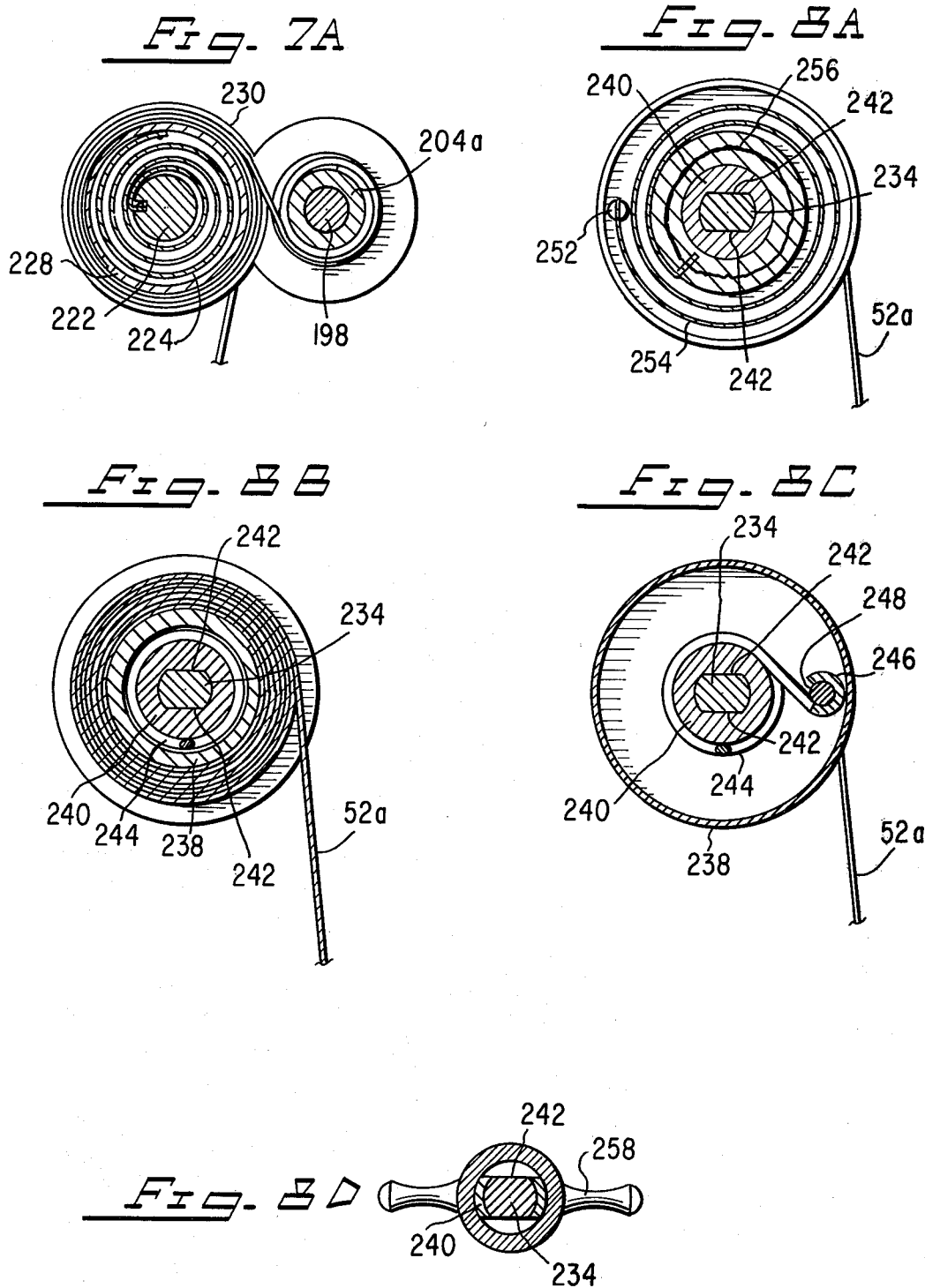

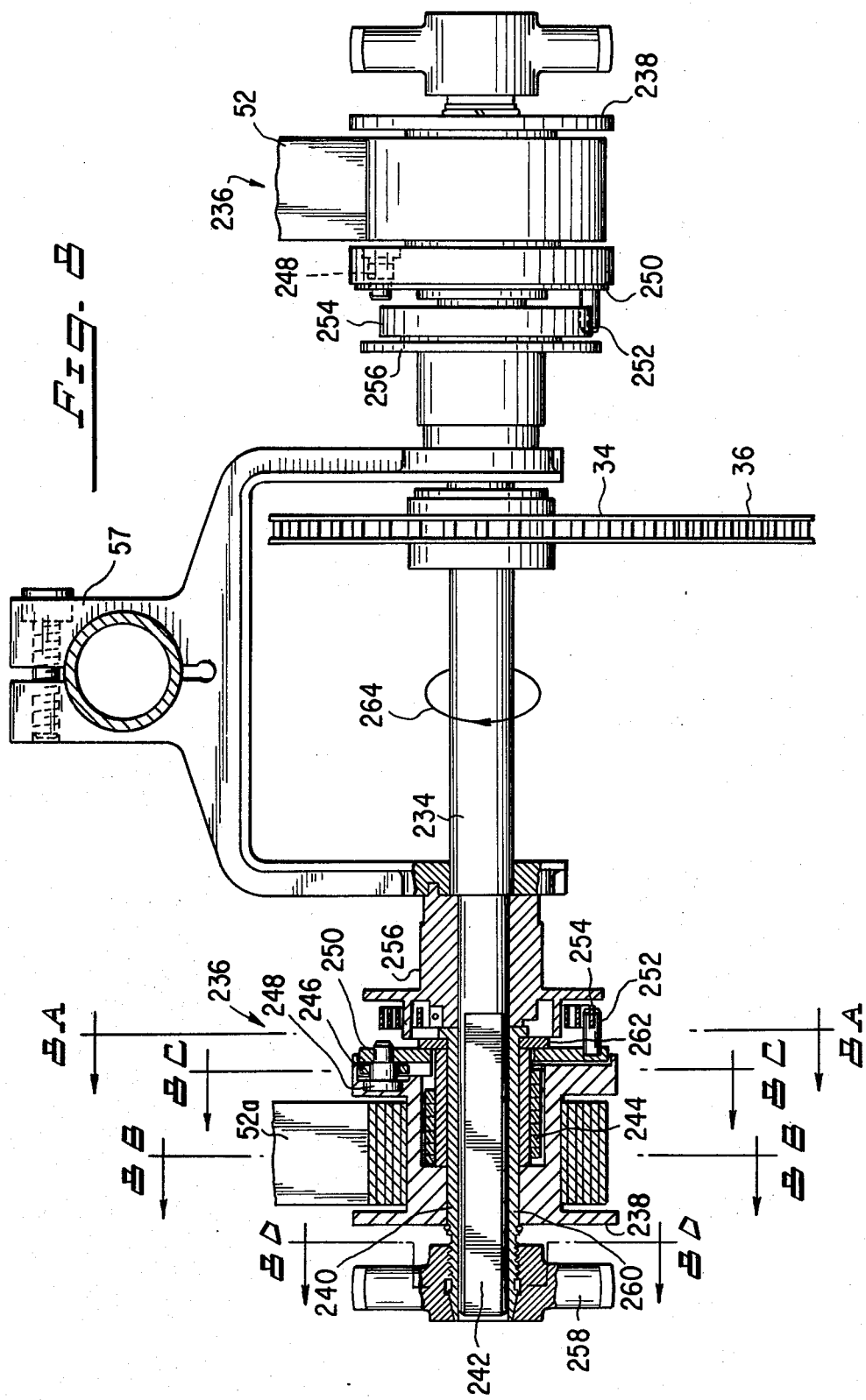

BICYCLE

BACKGROUND OF THE INVENTION

1. Field of the Invention

The invention relates in general to the field of bicycles and, in particular, to bicycles which are driven by oscillating pedals whose motion is converted into a unidirectional rotation of the drive wheel.

2. Background of the Invention

The conventional drive mechanisms for nearly all bicycles consists of a roller chain and sprocket transmission driven by a pair of rotary pedal cranks. While this design combines the advantages of simplicity and low friction to provide an inexpensive and relatively efficient design, such design does not provide a uniformly effective conversion of the substantially linear driving force exerted by the legs of the rider into drive torque. At the top and bottom of the pedal travel drive torque is minimal and reaches a maximum value only at the midpoint of downward travel of each pedal.

In order to overcome such a disadvantage and provide a more uniformly effective conversion, numerous designs have been proposed using a pair of oscillating pedals coupled to pedal levers pivotally suspended from a preselected point on the bicycle frame or the rear hub whose oscillatory motion is converted into a unidirectional motion of the drive wheel. Examples of such designs may be seen in U.S. Pat. Nos. 3,375,023, 3,954,282, 3,913,945 and 3,039,790.

The downward force of the pedals in such designs is transmitted generally by flexible tension members to a drive mechanism which converts the linear motion of such cables into the rotary motion of the rear wheel. While such designs do provide a more uniformly effective conversion of the driving force exerted by the rider than the rotary pedal crank driving mechanism, such designs fail to utilize the full driving force exertable by the rider. Such failure is due, for example, to an inadequate drive mechanism to translate the linear motion of the tension members into the rotary motion of the rear wheel and to an inadquate rewind mechanism for the tension members so that the tension members transmit all the force exerted upon it by the pedals to the drive mechanism and also return the pedals to the uppermost position in order to receive the full driving force of the rider. In addition, no provision is made for transverse stabilization of the pedals and pedal levers and for effectively varying the length of the pedal stroke to obtain maximum power under the particular riding condition. Finally, no provision is mde for rotatably restraining the feet of the rider, for enabling foot actuation of various mechanisms of the bicycle or for allowing the rider to exert his full driving force on the pedals while still permitting the rider to easily adjust his body position and at the same time assuring the safety of the rider.

Accordingly, it is a general object of the present invention to provide an improved oscillating pedal bicycle.

It is another object of the present invention to provide an oscillating pedal bicycle which has an improved drive and rewind mechanism.

It is a furtheer object of the present invention to provide an oscillating pedal bicycle which allows the stroke of pedal to be effectively varied.

It is another object of the present invention to provide an osciallating pedal bicycle which permits the driver to exert his full driving force to the pedal and still easily adjust his body position.

It is a further object of the present invention ot provide an oscillating pedal bicycle which provides for transverse stabilization of the pedals and includes rotatable foot restraints and foot actuated lever control mechanisms.

SUMMARY OF THE INVENTION

An oscillating pedal bicycle in which the downward force exerted by a rider is converted from the oscillating motion of the pedals into a unidirectional rotation of the drive wheel. The oscillating motion of the pedals are transmitted by flexible tension members to a conversion mechanism for converting the linear motion of such tension members into the rotary motion of the drive wheel. Maximum utilization of the motive power of the rider is achieved through the use of a quick-release, variable position body restraint and a variable height seat, both of which are adjustable while the bicycle is in motion, while maximum transfer and conversion of such motive power is achieved by an improved pedal return and tension member rewind mechanism and an improved drive mechanism. Pedal stabilizers, rotatable foot restraints and foot actuated lever control mechanisms are provided to maximize motive power and efficiency.

The novel features which are believed to be characteristic of the invention, both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 1 is a side view of an oscillating pedal bicycle illustrating the present invention.

FIG. 1A is a close-up view of a preferred embodiment of the body restraint of the present invention showing the seat in a raised and lowered position.

FIG. 1B is a close-up view of the preferred embodiment of the body restraint in its lowered position.

FIG. 1C is a cross-sectional view of the structure shown in FIG. 1A taken along lines 1C—1C of FIG. 1A.

FIG. 1D is a cross-sectional view of the structure shown in FIG. 1B taken along lines 1D—1D of FIG. 1B.

FIG. 2 is a rear view taken along lines 2—2 of FIG. 1 of the portion of the body restraint which enables the rider to vary his position.

FIG. 2A is a section view of FIG. 2 taken along lines 2A—2A of FIG. 2.

FIGS. 2B and 2C are section views of the structure shown in FIG. 2A taken along lines 2B—2B and 2C—2C of FIG. 2A.

FIG. 2D is a sectional view of the structure shown in FIG. 2A in an actuated position taken along lines 2B—2B of FIG. 2A.

FIG. 3 is a rear view FIG. 1 of the body restraint disengaging and seat lowering mechanism of the present invention.

FIG. 4 is a cross-sectional view of a portion of the seat height adjustment mechanism of the present invention.

FIG. 4A is a partial perspective and partial block diagram of the seat height adjustment mechanism of the present invention.

FIG. 5 is a cross-sectional view of the pedal lever and seat height adjustment mechanism taken along lines 5—5 of FIG. 1.

FIGS. 5A-5C are section views of the structure shown in FIG. 5 taken along lines A—A, B—B and C—C.

FIGS. 5D and 5E are section views of the structure shown in FIG. 5A taken along lines D—D and E—E.

FIG. 6 is a top cross-sectional view taken along lines 6—6 of FIG. 1 illustrating a first embodiment of the tension member rewind and drive mechanism of the present invention.

FIGS. 6A-6D are section views of the structure shown in FIG. 6 taken along lines 6A—6A, 6B—6B, 6C—6C and 6D—6D.

FIG. 7 illustrates a alternative embodiment of the tension member rewind mechanism shown in FIG. 6.

FIG. 7A is a cross-sectional view of the structure shown in FIG. 7 taken along lines 7A—7A of FIG. 7.

FIG. 8 is a top cross-sectional view taken along lines 6—6 of FIG. 1 illustrating a second embodiment of the tension member rewind and clutch mechanism of the present invention.

FIGS. 8A—8D are section views of the structure shown in FIG. 8 taken along lines 89A—8A, 8B—8B, 8C—8C, and 8D—8D.

DETAILED DESCRIPTION OF THE INVENTION

In FIG. 1 an oscillating pedal bicycle illustrating the present invention is shown. The bicycle has a tube frame that includes a seat tube 10 and a pair of diagonal tubes 12 and 14. The front portion of the diagonal tubes 12 and 14 is coupled to a steering fork 16 which supports the front wheel 18 and has mounted thereon the handlebars 20. The seat tube 10 supports a rod 22 on which is mounted the seat 24 upon which the rider sits. A pair of bracing tubes 26 and 28 are coupled to the upper and lower ends of the seat tube 10, respectively, and are used to support the driving wheel 30. The driving wheel 30 is driven by a derailleur mechanism 32 which in turn is driven by sprocket 34 and chain 36. Lever 38 mounted on diagonal tube 12 is used to actuate cable 40 to control the derailleur mechanism 32. Brake levers 42, 42a mounted on the handlebars 20 are used to actuate cables 44 and 46 to control the rear brake 48 and the front brake 50, respectively.

The sprocket 34 is driven by the oscillating motion of the flexible tension member 52, 52a which are coupled at one end to pedal levers 54, 54a and at the other end to a conversion mechanism 56 which converts the linear motion of the tension members 52 and 52a into the rotary motion of the drive wheel 30. Sproket 34 and conversion mechanism 56 are supported by bracket 57 coupled to the seat tube 10. The pedal levers 54, 54a pivot around point 58 and are supported by bracket 60 coupled to the diagonal tube 14. Foot pedals 62, 62a are pivotally coupled to the pedal levers 54,54a, respectively, and through the leg action of the rider causes the pedal levers 54, 54a to rotate around point 58 and thus cause the linear motion to the tension members 52, 52a. In order to stabilize the transverse motion of the pedal levers 54, 54a and the foot pedals 62, 62a, a pair of stabilizing rods 64, 64a are provided which go through members 66, 66a coupled to the pedal levers 54, 54a and upon which the pedal levers 54, 54a ride during their upward and downward motion. The stabilizing rods 64, 64a are supported by brackets 68 and 70 coupled to the seat tube 10 and the diagonal tube 14, respectively.

Seat 24 is raised and lowered by the motion of its supporting rod 22 which slides up and down inside cylinder 72 coupled to the seat tube 10. Rod 22 is hydraulically actuated to raise seat 24, as will be more fully shown hereafter, by pump 74 acting to force hydraulic fluid through tube 76 into cylinder 72. Pump 74 is actuated by lever 78 which is moved under pedal lever 54 by the action of cable 80 coupled to the foot pedal 62. Reservoir 82 is coupled to the pump 74 to provide hydraulic fluid thereto. Seat 24 is lowered through actuation of valve 84 by cable 86 coupled to foot pedal 62a or cable 88 coupled to disengaging means 90 to allow fluid to flow back from cylinder 72 to the reservoir 82 through tube 76 and tube 92.

The rider is held securely to the seat 24 of the bicycle by a strap 94 which is coupled to buckles 96, 96a which may be of the type used in automotive seat belts. The buckles 96, 96a are coupled by straps 98, 98a to engaging means 100, 100a which are supported by members 102 and 104. Member 104 is rotatably supported by bracket 106 coupled to rod 22 and may rotate in an up and down manner. Member 102 is also coupled to bracket 106 and is configured, as is shown more fully hereafter, so that it can rotate in both an upward and downward manner and a side to side manner. Engaging means 100, 100a which normally operate to maintain the strap 94 in a fixed position may be actuated by lever 108 and cable 110 to release the strap 94 while still keeping it under tension so that the rider can adjust his position. Engaging means 100, 100a may also be disengaged from members 102 and 104 by the actuation of cable 112 and cable 114 by the side to side rotation of member 102 interacting with disengaging means 90 as will be more fully shown hereafter. The side to side motion of member 102 interacting disengaging means 90 also serves to actuate cable 88 to cause seat 24 to lower as explained above.

Referring to FIG. 1A, the body restraint of the present invention is shown with the seat 24 being in raised and lowered positions, the raised position being shown in phantom. The seat 24 is supported by rod 22 which slides up and down, as stated above, in cylinder 72. Attached to the rod 22 is bracket 106 which rotatably supports member 104. Member 104 includes a portion 104a which is rotatably attached to the bracket 106 by bolt 116 and a portion 104b which supports engaging means 100a. Portions 104a and 104b are slidably coupled and have toothed sections which are kept in a locking engagement by spring 118. A shown in FIG. 1B, member 104 is free to rotate to a downwardly position whenever it is not supported by strap 98a due to, for example, the release of strap 98a by the rider disengaging the buckle 96a or due to the disengagement of engaging means 100a from member 104b, as shown more fully hereafter.

As shwon in FIGS. 1A, 1B and 1C, bracket 106 also rotatably supports member 102 ans disengaging means 90. Member 102 and disengaging means 90 are held in a upward position by the spring-loaded pin 120 positioned in aperture 122 in bracket 106. When pin 120 is pulled out by the rider, member 102 and disengaging means 90 rotate downwardly about bolt 124 which couples member 102 to bracket 106. In order to permit member 102 to rotate in a side to side manner, as stated previously, member 102 is comprised of portion 102a which is coupled to bracket 106 by bolt 124 and portion 102b which is coaxial with portion 102a. Yoke 126 serves to retain portion 102b on portion 102a and to anchor spring 128 which engages portion 102b to restrain the rotation thereof. The position of yoke 126 around portion 102a may be adjusted by key 130, as shown in FIG. 3, to allow the rider to increase or decrease the force needed to rotate portion 102b around 102a.

In FIGS. 2 through 2D the engaging means 100, 100a of the present invention is more fully illustrated. Engaging means 100, which may be identical to engaging means 100a, comprises a housng 132 which rotatably supports a pair of ratchets 134 which are coupled by a cylinder 136 upon which the belt 98 is wound. Spring 138 which is coupled to cylinder 136 and pin 140 urges belt 98 to remain in a coiled position on cylinder 136. Lever 142 is urged by spring 144 to engage ratchet 134 and prevent belt 98 from being unwound by the motion of the rider and to secure the rider to seat 24. When the rider wishes to adjust his position, he actuates lever 108 which causes cable 110 to pull the lever 142 out of engagement with ratchet 134 and allows belt 98 to be unrolled under tension if the rider moves forward or to be rewound if the rider moves backwards. Belt 98a simultaneously rewinds or unrolls, as the case may be, due to the action of cable 110 in disengaging the lever and ratchet associated with engaging means 100a. Upon release of the lever 108 by the rider, the levers and ratchets reengage and the belts securely hold the rider in his new position.

The housing 132 of engaging means 100 is secured to portion 102b by lip 146 and lever 148 which engage the bottom portion 150 of housing 132. When cable 114 is actuated, lever 148 coupled to cable 114 rotates around point 152 and out of engagement with the bottom portion 150 of housing 132. Thus the actuation of cable 114 either by the rider or by the side to side rotation of member 102, as more fully shown in FIG. 3, will cause engaging means 100 to be disengaged from member 102. In a like manner, engaging means 100a is disengaged from member 104 by the actuation of cable 112 by the rider or by the side to side rotation of member 102.

In FIG. 3, the body restraint disengaging and seat lowering mechanism of the present invention is illustrated. Portion 102b is shown supporting engaging means 100 and rotatable around portion 102a, portion 102a being urged into an upright position by spring 128 coupled thereto and to yoke 126. Portion 102b has coupled thereto contact member 154 which, upon being rotated with portion 102a, contacts lever arms 156 or 158 depending on the direction of rotation of portion 102a, lever arms 156 and 158 along with cable holder 160 comprise the disengaging means 90 coupled to portion 102a, as shown in FIG. 1B. The motion of contact member 154, as shown in FIG. 3, causes lever arm 156 to pivot and to actuate cable 162. The actuation of cable 162 causes cables 114 and 112 attached thereto through coupling means 166 fastened to bracket 106, as shown in FIG. 1B, to be actuated and disengage engaging means 100 and 100a from members 102 and 104. In a similar manner, the pivoting of lever arm 158 when engaged by member 154 actuates cable 168 and causes cables 114 and 112 attached thereto through coupling means 166 to be actuated and disengage engaging means 100 and 100a from members 102 and 104. A cross-sectional view of coupling means 166 is shown in FIG. 1D and illustrates the manner in which cables 162, 168, 114 and 112 are intercoupled. As shown in FIG. 3, the pivoting of lever arms 156 and 158 also actuates cables 164 and 170 which are coupled to cable 88. Since cable 88 is coupled through cable 86 to the valve 84, the actuation of either cable 164 and 170 by the side to side motion of portion 102b not only causes the engaging means 100 and 100a, and thus belts 98 and 98a, to be disengaged but also causes the seat 24 to be lowered through the downward motion of rod 22 into cyclinder 72.

The seat height adjustment mechanism of the present invention is illustrated in FIGS. 4 and 4A. Hydraulic fluid is drawn from reservoir 82 though tube 172 by pump 74 actuated by lever 78, which as illustrated in FIG. 1, is moved under pedal lever 54 by the action of cable 80 coupled to foot pedal 62, and is forced through tube 76 into chamber 174 inside of cylinder 72 mounted in seat tube 10. Such pumping action causes rod 22 to move upwards thus raising seat 24 and bracket 106 coupled thereto. Seat 24 is lowered by opening valve 84 by the actuation of cable 86 to allow hydraulic fluid to flow back into reservoir 82. As stated previously, cable 86 is actuated either by disengaging means 90 through cable 88 or by foot pedal 62a as shown hereafter. Thus seat 24 may be raised or lowered by the rider as he desires in order to adjust the amount the foot pedals 62, 62a travel when the rider extends his legs to their utmost extent. For a full stroke travel of the foot pedals 62, 62a and thus the pedal levers 54, 54a, which in the present embodiment is approximately twelve inches, the seat 24 is raised by the rider to a position suitable for his leg length so that his legs are straight when the foot pedals 62, 62a reach the bottom of their travel as determined by stabilizing rods 64, 64a as shown in FIG. 5D. For shorter, more rapid stroke travels, the rider merely raises the seat 24 to the desired position. Since the rider's legs are always extended to their straight position, maximum power and efficiency are always obtained under the particular riding conditions, such as short, rapid strokes for uphill terrain and long strokes for lever or downhill terrain.

FIGS. 5 through 5E illustrate the foot pedal, pedal lever and seat height adjustment mechanism of the present invention. Pedal levers 54, 54a are supported by bracket 60 coupled to the diagonal tube 14 and pivot around points 58. Springs 176 and 176a are provided to limit the upward motion of the pedal levers 54, 54a, while members 66, 66a sliding on stabilizing rods 64, 64a limit the downward motion of pedal levers 54, 54 a and foot pedals 62, 62 a. The foot pedals 62, 62a are pivotally coupled to pedal levers 54, 54a around point 178 through bolts 180, 180a and brackets 182, 182a which couple members 66, 66a, foot pedals 62, 62a and pedal levers 54, 54a. Springs 184 are provided to cushion and restrain the downward force of the pedal levers 54, 54a as they reach the limit of their travel on stabilizing rods 64, 64a. The limits of the upward motion of the pedal levers 54, 54a can be adjusted by rotating collars 177 and 177a to adjust the tension of springs 176 and 176a, while the limits of the downward motion of the pedals levers 54, 54a can be adjusted by rotating turnbuckle 183 to vary the position of stabilizing rods 64, 64a relative to members 66, 66a and springs 184. Foot pedals 62, 62a are provided with front plates 186, 187a, back posts 188, 188a and pivotal plates 190, 190a, which pads 191, 191a made of an engaging material, such as velcro, attached thereto, to secure the shoes of the rider and to limit the motion of the rider's shoes on the foot pedals 62, 62a. A corresponding engaging pad 193 and strap 195 for the shoe of the rider is shown in FIG. 5E. Foot pedal 62 has a lever mechanism 192 pivotally coupled thereto and actuated by the rider rotating his left shoe clockwise to cause cable 80 to bring lever 78, normally restrained by spring 194, under pedal lever 54a to provide pumping action to raise the seat 24. Foot pedal 64a has a lever mechansim 196 pivotally coupled thereto and actuated by the rider rotating his right shoe counterclockwise to cause cable 86 to actuate valve 84 to lower the seat 24. Thus seat 24 may be raised or lowered by simple rotational motion of the rider's shoes on the foot pedals 62, 62a. Such lever mechanisms can alternately be used to perform other functions as, for example, actuating the brakes of the bicycle or adjusting or releasing the body restraint.

In FIGS. 6 through 6D, the tension member rewind and drive mechanism of the present invention, generally designated in FIG. 1 as the conversion mechanism 56, is illustrated. Since the conversion mechanism 56 is symmetrical, the following description applies to both the right and left portions of such mechanism. As stated previously with reference to FIG. 1, the conversion mechanism 56 and sprocket 34 are supported by bracket 57 coupled to the seat tube 10. Bracket 57 has a yoke shaped configuration and carries on it a central shaft 198, the tension rewind mechanism 200 and the drive mechanism 202. Tension member 52a is carried by cylinder 204, as shown in FIG. 6B, which is rotatably coupled to shaft 198 and which has a pin 206 extending therefrom into housing 208. Housing 208 is coupled to sleeve 210 which is keyed into boss 212 formed integral with shaft 198, as shown in FIG. 6D. Sleeve 210 carries thereon a flat coil spring member 214 which has portion 216 thereof looped around pin 206, as shown in FIG. 6C. Cylinder 204 has gear 218 coupled thereto which intermeshes with gear 220 which rotates around shaft 222 connected to the bracket 57. Shaft 222 carries spring 224 thereon which is coupled at one end to shaft 222 and at the other end to gear 220, as shown in FIG. 6A.

In operation, the motion of pedal lever 54a causes tension member 52a, shown in the form of a flexible belt, to unwind off of cylinder 204 in the direction indicated by arrow 226. Such motion of cylinder 204 causes spring 214, which has a close slip fit around sleeve 210, to instantly tighten onto and firmly engage sleeve 210 due to the pressure exerted on portion 216 looped around pin 216. The motion of cylinder 204 is thus instantly transmitted to shaft 198 which is keyed to sleeve 210 through boss 212 and hence the linear motion of pedal lever 54a driven by the leg of the rider is instantly converted into the rotary motion of the shaft 198 in the direction indicated by the arrow 226. At the same time the tension member 52a is being unwound, the motion of the cylinder 204 causes spring 224 to become tightly coiled due to the coupling of gear 218 driven by cylinder 204 and gear 220. Thus during the stroke of pedal lever 54a the tension member 52a has an ever increasing rewind force being applied to it and at the end of the stroke of pedal lever 54a, the tension member 52a is immediately rewound and the pedal lever 54a returned to its upper position by the force of the tightly coiled spring 224 applied to cylinder 204 through intermeshed gears 220 and 218. If the ratio of gear 220 to gear 218 is greater than 1, as for example 2.5:1, a stronger rewind spring 224 may be employed, thus permitting the extremely rapid rewind and pedal lever return necessary for the efficient actuation of the rapid, short strokes of the pedal levers during, for example, fast uphill pedalling or rapid acceleration. Since the right and left portions of the mechanism operate totally independent of one another, the pedal levers 54, 54a may be depressed alternately for smooth continous motion or simultaneously for fast powerful intermittent motion, as during rapid acceleration. Since the position of the rider is restrained and since the linear motion of the tension members is instantly converted without slippage loss into the rotary motion of the shaft, maximum transfer of the motive power of the rider is achieved.

In FIGS. 7 and 7A an alternative embodiment of the tension member rewind mechanism is illustrated. The structure shown in FIG. 7 is similar to that shown in FIG. 6 with, however, cylinder 228 and flexible member 230, such as a metal band, replacing gears 218 and 220. Cylinder 228 rotates around shaft 222 and has spring 224 attached to the inside surface thereof and member 230 attached at one end to and coiled around the outside surface thereof. The other end of member 230 is attached to and coiled around portion 204a of cylinder 204. When tension member 52a is unwound from cylinder 204, the motion of cylinder 204 causes member 230 to be wound onto portion 204a thereof and off of cylinder 228. Cylinder 228 thus rotates around shaft 222 and coils spring 224. Conversely, when the force is released from tension member 52a, spring 224 causes cylinder 228 to rotate and wind member 230 thereon and off portion 204a, thus causing tension member 52a to be rewound onto cylinder 204. Since member 230 is constantly under tension, there is no hesitancy in the rewind of tension member 52a as could be caused when the force involved is transferred from one set of opposed gear teeth faces to another such set, particularly as the gear teeth tend to wear or become mismated due to the rapid and frequent changes of the direction of the forces applied thereto.

In FIGS. 8 through 8D, a second embodiment of the tension member rewind and drive mechanism is illustrated. This embodiment is particularly useful when it is necessary to be able to quickly replace a tension member rewind and drive mechanism due to damage to the mechanism.

Bracket 57 coupled to seat tube 10 is yoke shaped and supports a central shaft 234 which has sprocket 24 coupled thereto. On both sides of the bracket 57 are tension member rewind and drive mechanisms 236. Tension member 52a is carried by cylinder 238 which rotates around sleeve 240 coupled to the shaft 234 which has flattened sides 242 to prevent the slippage of sleeve 240. Sleeve 240 has a flat coiled spring 244 thereon which has a portion 246 thereof looped around pin 248 extending from cylinder 238. Pin 248 also extends into plate 250 which rotates around sleeve 240 and carries pin 252 thereon. Spring 254 is anchored at its outside edge to pin 252 and to member 256 at its inner edge; Member 256 rotates around the shaft 234 and is keyed to bracket 57. Wing nut 258 acts to retain the entire mechanism 236 on the shaft, 234 while washers 260 and 262 keep cylinder 238 and plate 250 in position on sleeve 240.

In operation the motion of pedal lever 54a causes tension member 52a to unwind off of cylinder 238 in the direction indicated by arrow 264. Such motion of cylinder 238 causes spring 244, which has a close slip fit around sleeve 240, to instantly tighten onto and firmly engage sleeve 240 due to the pressure exerted on portion 246 looped around pin 248. The motion of the cylinder 238 is thus instantly transmitted to sleeve 240 and thus to shaft 234 keyed thereto. At the same time the tension member 52a is being unwound, the motion of cylinder 238 and pin 248 causes plate 250 to rotate and to tighten coil spring 254 which, as stated above, is anchored at its outer edge to plate 250 by pin 252 carried on plate 250 and at its inner end to member 256 keyed to bracket 57. Thus during the stroke of pedal lever 54a the tension member has an ever increasng rewind force being applied to it, by spring 254, and at the end of the stroke of pedal lever 54a the tension member 52a is immediately rewound and the pedal lever 54a returned to its upper position by the force of the tightly coiled spring 254 applied to cylinder 238 through plate 250 and pins 248 and 252. If it is necessary to replace mechanism 236, wing nut 258 is removed and sleeve 240 and member 256 are slid off of shaft 234 and a new mechanism 236 placed thereon.

Having thus described the invention, it is apparent that numerous modifications can be made thereto by persons skilled in the art, all of which fall within the scope of the present invention. Hence, the invention is to be construed as being limited only by the spirit and scope of the appended claims.

What is claimed is:

1. A restraint mechanism for a bicycle rider comprising:
   (a) means for engaging the body of the rider;
   (b) first and second coupling means for selectively joining said body engaging means to preselected portions of said bicycle;
   (c) a first engagng means having spring means for selectively retaining said first coupling means in a first preselected position;
   (d) a second engaging means having spring means for selectively retaining said second coupling means in a first preselected position;
   said first and second engaging means each including means for releasing the associated spring means from the associated coupling means thereby permitting adjustment of said body engaging means, said releasing means configured such that upon actuation, the associated coupling means is movable into a second preselected position, and upon deactuation, the associated coupling means is retained in said second position.

2. The restraint mechanism according to claim 1, wherein said first coupling means is disposed about the associated spring means in said first engaging means and said second coupling means is disposed about the associated spring means in said second engaging means whereby upon actuation of the associated releasing means, said first and second coupling means is wound onto or unrolled under tension from the associated spring means permitting the rider to adjust said body engaging means.

3. The restraint mechanism according to claim 1 wherein a first cable is joined to said first engaging means and a second cable is joined to said second engaging means, said first and second cables for selectively releasing the associated engaging means from the associated coupling means.

4. A restraint mechanism according to claim 1 wherein disengaging means is disposed on said bicycle and coupled to each said engaging means such that upon sufficient movement of the rider in a predetermined direction, said disengaging means disengages each of the coupling means from the associated engaging means rendering said coupling means movable.

5. A restraint mechanism according to claim 1 wherein each said releasing means is a ratchet member coupled to the associated spring means.

6. A restraint mechanism according to claim 1 wherein said first and second engaging means are each rotatably coupled to said bicycle.

7. A restrain mechanism according to claim 3 including a lever member, said first and second cables being joined to said lever member such that sufficient movement of said lever member causes each associated engaging means to release the associated coupling means.

8. A restraint mechanism for a bicycle rider comprising:
   (a) means for engaging the body of the rider;
   (b) first and second strap means for engaging said body engaging means;
   (c) a first engaging means joined to said first strap means for selectively retaining said first strap means therein in a first preselected position;
   (d) a second engaging means joined to said second strap means for selectively retaining said second strap means therein in a first preselected position;
   (e) a first cable means joined to said first engaging means;
   (f) a second cable means joined to said second engaging means;
   said first and second cable means also joined to a lever member such that movement of said lever member releases said first and second engaging members from said first and second strap members, respectively, permitting movement of said body engaging means from said first preselected position to a second preselected position.

9. A restraint mechanism according to claim 8 wherein a portion of each of said first and second strap means is wound under tension about an associated winding member disposed in each said engaging means.

10. A restraint mechanism according to claim 9 wherein each said winding member is selectively movable in said engaging means.

11. A restraint mechanism according to claim 10 wherein each said engaging means includes means for selectively releasing the associated strap means from said winding member.

12. A restraint mechanism for a bicycle rider comprising:
   (a) means for engaging the body of the rider;
   (b) first and second coupling means for engaging said body engaging means;
   (c) a first engaging means joined to said first coupling means for selectively retaining said first coupling means therein in a first preselected position;
   (d) a second engaging means joined to said second coupling means for selectively retaining said second coupling means therein in a first preselected position;
   (e) disengaging means coupled to each said engaging means and configured such that upon sufficient movement of said rider in a predetermined direction, said disengaging means disengages each of the coupling means from the associated engaging means rendering said coupling means movable.

13. A restraint mechanism according to claim 12 wherein each said engaging means includes means for winding and unwinding a portion of the associated coupling means under tension into and out of said holding means.

14. A restraint mechanism according to claim 13 wherein means for releasing said winding means is disposed in each said engaging means, and said engaging means is joined to each said releasing means.

15. A restraint mechanism according to claim 12 wherein said disengaging means include outwardly extending lever arm members and a contact member, said lever arm members and contact member configured such that rotation of said rider causes one of said contact member to engage one of said lever arm members thereby rendering said first and second coupling means movable.

* * * * *